Dec. 23, 1969 — K. BEERLI — 3,485,029
TEXTILE SPINDLE
Filed June 6, 1967 — 2 Sheets-Sheet 1

INVENTOR.
Karl Beerli
BY
Attys.

Dec. 23, 1969     K. BEERLI     3,485,029
TEXTILE SPINDLE
Filed June 6, 1967     2 Sheets-Sheet 2
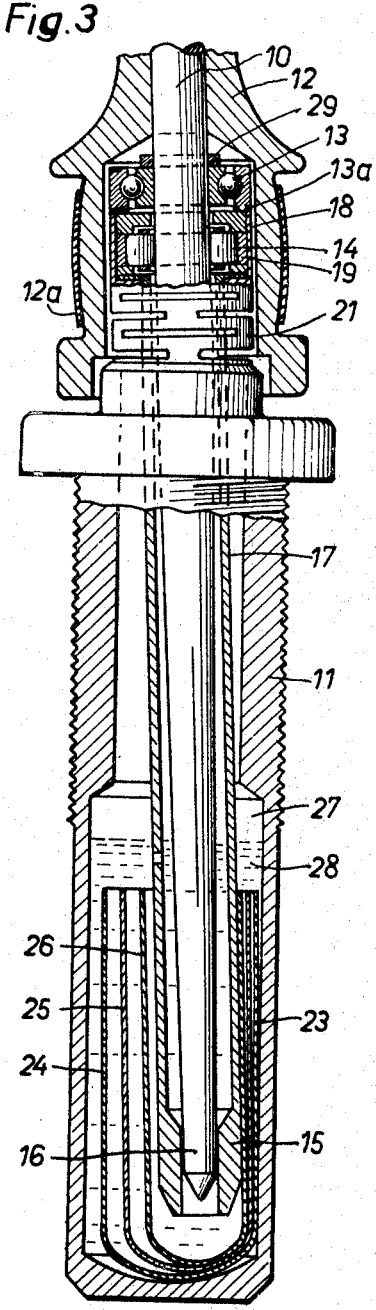
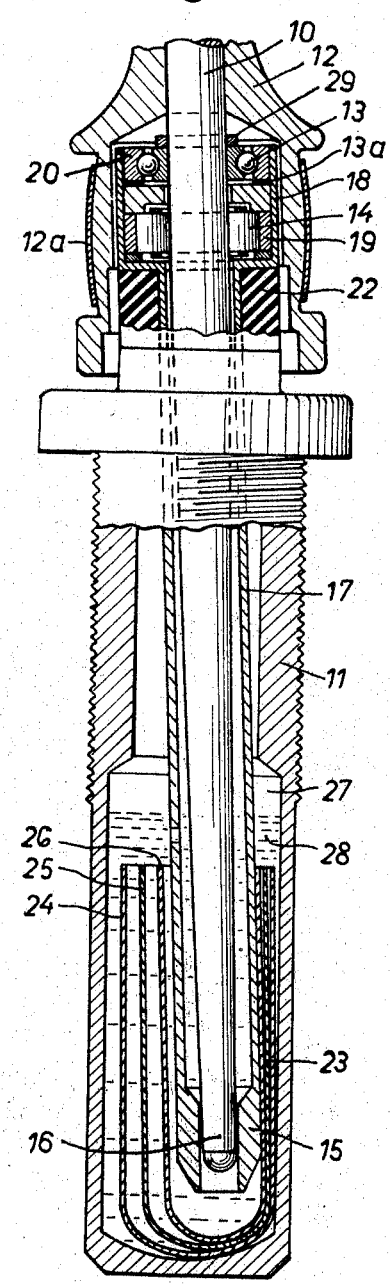
INVENTOR.
Karl Beerli

United States Patent Office 3,485,029
Patented Dec. 23, 1969

3,485,029
TEXTILE SPINDLE
Karl Beerli, Uster, Zurich, Switzerland, assignor to Spindel-, Motoren- und Maschinenfabrik AG, Uster, Zurich, Switzerland
Filed June 6, 1967, Ser. No. 643,937
Claims priority, application Switzerland, June 10, 1966, 8,449/66
Int. Cl. D01h 7/20
U.S. Cl. 57—134                    4 Claims

ABSTRACT OF THE DISCLOSURE

A vertically moving textile spindle, such as a spinning spindle or a twisting spindle, having a shaft supported in thrust and radial bearings, which bearings are arranged for wobbling movement inside a bearing housing, and furthermore having stabilizing means for attenuating the wobbling movement.

---

The invention relates to a textile spindle of the kind referred to above which is capable of working with high speeds and with high spindle weights.

Known textile spindles of the type described are constructed as shown, partly in section and in an extremely deflected position in FIGURES 1 and 2 of the drawings.

In this construction, the spindle shaft 1, of which only the lower and, in this connection, interesting part is represented, is supported on the one hand in a radial or collar bearing 2 respectively 3, and on the other hand in a thrust or vertical bearing 4. In the embodiment shown in FIGURE 1, the collar bearing 2 is mounted rigidly in a bearing housing 5, whilst the vertical bearing 4 is arranged at the lower end of a tubular flexible bearing sleeve 6.

The upper end of the bearing sleeve 6 is connected with the bearing housing. For allowing this arrangement to make a wobbling movement, the collar bearing 2 is crowned, or has so much play with respect to the spindle shaft 1, that the lower end of the bearing sleeve 6 and, therefore, also the vertical bearing 4 may be deflected in any direction from its vertical position. This deflecting movement is counteracted by both the bending elasticity of the bearing sleeve 6 and by the action of the stabilizing means surrounding the lower end of the bearing sleeve. The stabilizing means comprises a series of tubes 7 arranged in the lower part of the bearing housing which forms a closed container filled with a damping or stabilizing liquid 8. The damping liquid may serve at the same time as lubricant for the vertical bearing 4 which takes up the whole axial thrust of the spindle shaft.

The embodiment shown in FIGURE 2 is an improvement of the construction of FIGURE 1, in that the collar bearing 3 is always maintained coaxial with respect to the vertical bearing 4. To this end, the elastically deformable part of the construction has the form of a slotted sleeve-like head 9 of the bearing housing, whilst the tubular inner bearing sleeve 10 is rigid and remains substantially straight during the deflecting movements.

The operation of these constructions is known for one skilled in the art so that at this place no further explanations are necessary. However, it should be noted that, in known spindles, the vertical bearing mounted near the stabilizing means must take up the entire vertical load of the spindle shaft. This vertical load is, for its greatest part, caused by the bobbin body put onto the upper not represented end of the spindle shaft.

As long as the machine is working with small vertical loads, i.e. with loads in the range of some pounds, and with low speed, i.e. up to 3,000 r.p.m., the spindles represented in FIGURES 1 and 2 have a sufficient "absorption capacity" for the inevitable unbalance effects of the shafts. The general endeavour to get increased production always requires higher vertical loads and higher speeds. However, the "absorption capacity" for unbalance effects with vertical loads in the range of 20 lbs. and with speeds in the range of 10,000 r.p.m., could not be increased by simply using correspondingly increased spindles. Also, for constructive reasons (available space), the use of greater spindles is not possible.

The "absorption capacity" for unbalance effects of the spindles is based on the liquid resistance of the stabilizing liquid, which resistance itself depends on the viscosity of the liquid. A reduction of the viscosity results in a corresponding reduction of the "absorption capacity." The viscosity of the most important stabilizing or damping liquids is a function of their temperatures.

In the known spindles, as described hereinabove, there is, in the effective or working range of the stabilizing liquid, a source of heat in the form of the vertical bearing, which source is the more effective the more the stabilizing effect is needed. In other words, the heat produced in the bearing increases with an increasing load (vertical load and speed) of the vertical bearing, and this heat is, of course, transferred to the stabilizing liquid. This results in a reduction of the viscosity and the stabilizing properties of the liquid. The moving or running spindle will be caused to whirl and to wobble, and this the more the greater the weight of the running bobbin body. The increasing whirling movement of the spindle is accompanied by an increasing friction heat produced in the vertical bearing, as in this case the bearing has to take up, besides the axial load, some lateral forces or loads. If, in this case, the vertical load and/or the speed is not reduced, which of course is in conflict with the purpose or objective which should be attained, the spindle will only work a very short time.

It is an object of the present invention to provide a textile spindle of the kind described above which is avoiding the drawbacks of known spindles.

This objective is obtained by this invention in that the axial or vertical bearing is arranged outside the stabilizing means and near the upper end of the bearing housing.

In this construction, the source of heat which is affecting the characteristics of the damping means has been displaced out of the active field of the damping means at a place where the friction heat is absorbed without influencing the damping means. A further advantage of the improved spindle is a substantially greater freedom for the dimensions of the vertical bearing. The vertical bearing may be, as the radial bearing, a roller bearing, and be mounted near the radial bearing.

Preferably, the stabilizing or damping means is of the known type, and it may act on the lower end of the spindle shaft. In this case, the lower end of the spindle shaft may be journaled in a second radial bearing mounted at the lower end of a rigid bearing sleeve, the upper end of the sleeve carrying the first or main radial bearing and the vertical bearing. This arrangement is connected for wobbling movement and for rotary motion with the remaining part of the bearing housing.

Embodiments of the invention will now be described by reference to the drawings in which:

FIGURE 3 illustrates a first embodiment of the invention, partly in section, and FIGURE 4 illustrates a similar view of a second embodiment of the invention.

Figure 1:
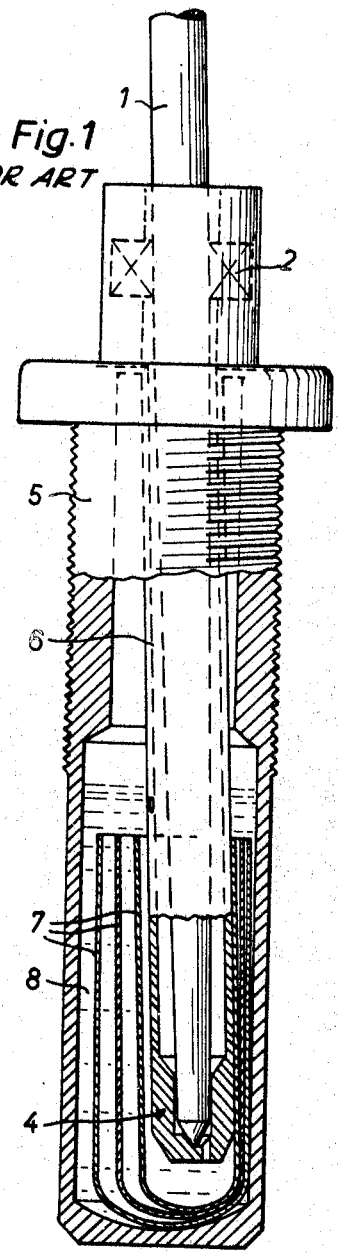
FIGURES 1 and 2 illustrate known textile spindles as described above.
Figure 2:
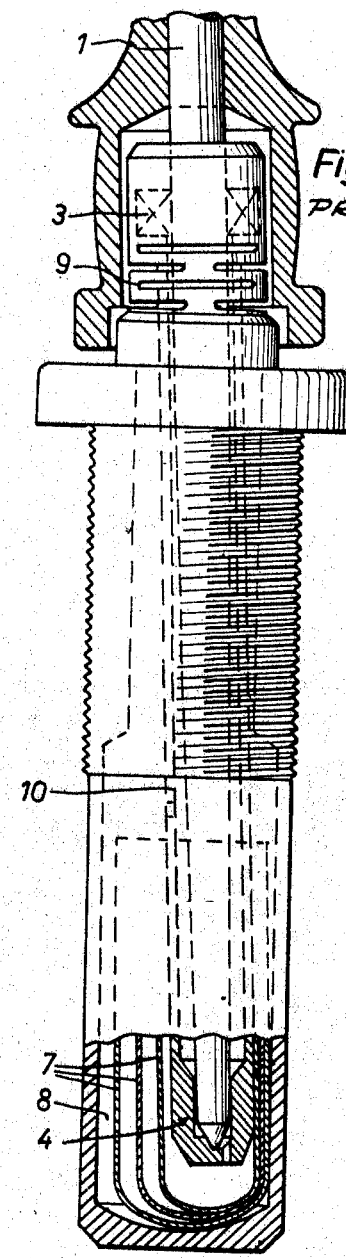

As shown in FIGURES 3 and 4, a spindle shaft 10, of which only the lower, in connection with the present invention, interesting part is represented, is supported for rotary motion in a bearing housing 11. In this embodiment, the spindle is driven over a whirl 12 mounted on the spindle shaft 10 by means of a belt drive 12a. The spindle is journaled at three places by means of a ball-bearing 13, which is taking up the axial forces, a roller bearing 14, which is taking up the radial forces, and a collar bearing 15, which co-operates with the lower end 16 of the spindle shaft 10.

All of these three bearings 14, 13 and 15 are mounted in a rigid tubular bearing sleeve 17 comprising an upper part or head 18 of increased diameter for taking up the outer rings 19 and 20 of the roller and ball bearings 14 and 13 respectively. A ring 13a of elastic material is provided between the ball-bearing 13 and the roller bearing 14. The bearing sleeve 17 is mounted coaxially to the spindle shaft 10 and projects downwards with sufficient radial play into the housing 11. The sleeve is, only with its upper end, connected to the housing. The connection is made by means of an elastically deformable member, which in FIGURE 3 is a slotted sleeve 21 and in FIGURE 4 a rubber or rubber-like elastic collar 22. This elastically deformable member is fixed with its uper end face to the bearing sleeve 17 and with its lower end face to the bearing housing 11.

This construction permits the bearing sleeve 17 to make a wobbling movement with respect to the housing 11, whereby the center of the wobbling movement is substantially at the same height as the elastically deformable member. Whilst, due to the rigidity of the bearing sleeve 17, this wobbling movement will not affect the relative position of the three bearings 13, 14 and 15, i.e. these bearings remain always coaxial with respect to one another, this movement will cause a whirling or wobbling movement of the lower part of the bearing sleeve 17 inside the bearing housing 11. The wobbling movement itself, which has to be damped or stabilized, is caused during operation of the spindle by the out-of-balance forces occurring in the upper not represented part of the spindle shaft. To this end, there is provided a well known stabilizing means 23 co-operating with the lower section of the bearing sleeve 17. This stabilizing means or device comprises three tubes 24, 25, 26 embosed in each other and is arranged in the enlarged lower chamber 27 of the bearing housing. The outermost tube 24 lies with radial play within the chamber 27 and the innermost tube 26 surrounds, also with the sufficient radial and axial play, the lower end of the bearing sleeve. The chamber 27 is filled with a damping or stabilizing liquid 28 which provides, together with the tubes 24, 25 and 26, the stabilizing effect.

The bearing 15, in operation of the spindle, receives a relatively great stress only when the system spindle shaft 10 and bearing sleeve 17 are in wobbling movement, which may arrive due to an out-of-balance effect. But even in this case, the stress will be very small compared with the stress in known devices, in which the function of the bearing 15 is carried out by a foot or vertical bearing which had to take up not only the whole axial load of the spindle, but also the radial forces caused by the wobbling movement. The bearing 15 in the construction of the present invention does not provide an undesirable source of heat caused by frictional forces, and thus the viscosity and, therefore, the damping or stabilizing characteristics of the liquid 28 remain constant, i.e. do not depend on the load and the speed of the spindle. The bearing 15 has only two functions to fulfill, namely to align the outer rings of the axial bearing 13 and of the radial bearing 14, after the wobbling movement of the lower end of the spindle shaft, relatively to the bearing sleeve 17, and to transmit the restoring forces of the stabilizing means to the lower end of the spindle shaft 10.

The heat appearing due to frictional movement of the loaded spindle in the bearings 13 and 14 is eliminated through the whirl 12.

It should be noted that a further advantage lies in the fact that there is much more available space for the axial bearing 13, and this, with the same total mass of the spindle compared with known spindles, so that it is possible to provide for the same load larger bearings with a corresponding smaller specific load and a higher working life. It is possible, even with a higher total load, to reduce the specific load of the bearing due to the possibility of providing larger dimensioned bearings compared with known spindle types.

The reason for which, in the embodiment shown in FIGURES 3 and 4, there is provided a ball-bearing 13, the inner ring thereof being fixed by means of a spring washer or a collar 29 against axial movement on the spindle shaft, whilst the radial bearing is formed by a successful roller or needle bearing 14 without any inner ring, is a purely economical compromise for which already known and useful devices have been taken into account. This construction, in fact, permits converting known spindles in which the axial bearing was mounted near the stabilizing means in a very simple manner into a spindle according to the invention. This has been indicated in FIGURE 3, where the lower end of the spindle shaft 10 is tapered towards the end just as for being journaled in a known end bearing (axial or vertical bearing).

It is, of course, possible to provide the radial bearing above the axial bearing. It is also possible to unite both bearings in a single bearing capable of taking up axial as well as radial loads. Such a single bearing may be realized in the form of a conical roller bearing.

Furthermore, the bearing sleeve 17 is not absolutely necessary for achieving the desired effect. It would be possible to connect the bearing 15 with the innermost tube 26 of the damping or stabilizing means. In this case, the bearing may be provided with a chamfer in order to facilitate the introduction of the lower end of the spindle shaft. In such a construction, both the axial and radial bearings should be constructed in a suitable manner so as to be able to follow the wobbling movement of the spindle shaft without any risk of locking.

I claim:
1. A textile spindle comprising a substantially vertical rotatable spindle shaft journaled in a bearing housing by means of a radial bearing mounted at the upper end of the bearing housing and an axial bearing taking up the axial load of the spindle shaft, both bearings being arranged for wobbling movement with respect to the bearing housing, and a stabilizing means surrounding the lower part of the spindle shaft for attenuating the wobbling movement of the spindle shaft, said axial bearing being mounted outside the stabilizing means near the upper end of said bearing housing.

2. A textile spindle as claimed in claim 1, in which said axial bearing and said radial bearing are two separate bearings.

3. A textile spindle comprising a substantially vertical rotatable spindle shaft journaled in an axial bearing and a radial bearing both mounted at the upper end of a bearing sleeve which is arranged for wobbling movement with respect to a bearing housing, and a stabilizing means provided in the lower part of the bearing housing, the lower end of said bearing sleeve projecting for cooperation with the stabilizing means into said bearing housing and carrying a second radial bearing for radially guiding the lower end of said spindle shaft in the bearing sleeve.

4. A textile spindle as defined in claim 3 wherein said axial and radial bearings are mounted in an extension of the upper end of said bearing sleeve, said axial bearing being supported by said radial bearing, and including a ring of elastic material disposed between said axial and radial bearings.

(References on following page)

References Cited

UNITED STATES PATENTS

| | | | |
|---|---|---|---|
| 2,387,260 | 10/1945 | Hargreaves et al. | 57—135 |
| 2,680,659 | 6/1954 | Morrison et al. | |
| 2,696,707 | 12/1954 | Meadows | 57—130 |
| 2,742,754 | 4/1956 | Staufert | 57—130 XR |
| 2,908,533 | 10/1959 | Schurr et al. | 308—152 |
| 2,777,739 | 1/1957 | Beerli. | |
| 3,157,980 | 11/1964 | Kelecom | 57—134 XR |
| 3,298,757 | 1/1967 | Schmid | 308—156 XR |
| 3,333,408 | 8/1967 | Keyser | 57—130 XR |

FOREIGN PATENTS 74,641  4/1917  Austria.

OTHER REFERENCES

German printed application No. DAS 1,116,586, November 1961, Schmid.

STANLEY N. GILREATH, Primary Examiner

W. H. SCHROEDER, Assistant Examiner

U.S. Cl. X.R.

308—152